(12) United States Patent
Steinbock et al.

(10) Patent No.: US 7,637,706 B2
(45) Date of Patent: Dec. 29, 2009

(54) PRE-STRESSING APPARATUS USING A SPLIT THREADED FASTENER

(75) Inventors: Robert C. Steinbock, Bridgeville, PA (US); Allan T. Steinbock, Pittsburgh, PA (US)

(73) Assignee: Steinbock Machinery Corproation, Carnegie, PA (US)

( * ) Notice: Subject to any disclaimer, the term of this patent is extended or adjusted under 35 U.S.C. 154(b) by 75 days.

(21) Appl. No.: 11/894,351

(22) Filed: Aug. 21, 2007

(65) Prior Publication Data

US 2009/0053009 A1    Feb. 26, 2009

(51) Int. Cl.
*F16B 37/08*    (2006.01)
(52) U.S. Cl. ...................................... 411/432; 411/14.5
(58) Field of Classification Search ................ 411/14.5, 411/432–434, 267; 254/DIG. 8
See application file for complete search history.

(56) References Cited

U.S. PATENT DOCUMENTS

| | | | | |
|---|---|---|---|---|
| 4,332,169 A | * | 6/1982 | Stuart | 73/487 |
| 4,927,305 A | * | 5/1990 | Peterson, Jr. | 411/14 |
| 5,161,928 A | * | 11/1992 | Burdick, Jr. | 411/433 |
| 6,799,930 B1 | * | 10/2004 | More et al. | 411/433 |

* cited by examiner

*Primary Examiner*—Gary Estremsky
(74) *Attorney, Agent, or Firm*—Clifford A. Poff; Suzanne Kikel (57) ABSTRACT

A fastener includes a threaded circular ring half divided along a plane intersecting a central longitudinal axis. One of the end walls is formed with a truncated conical load-bearing surface that is seated on a truncated conical thrust surface formed on a circular ring of a stress generator. The load bearing and thrust generating surfaces are arranged to present a conjugate pair of truncated conical surfaces to provide a favorable resolution of forces developed by torque applied to jack bolts distributed about an outwardly surrounding cylindrical stress generator body section.

13 Claims, 6 Drawing Sheets

PRE-STRESSING APPARATUS USING A SPLIT THREADED FASTENER

CROSS-REFERENCE TO RELATED APPLICATIONS

Not applicable

BACKGROUND OF THE INVENTION

The present invention relates to a threaded fastener for joining together large component parts of a machine and, more particularly, to a multi-piece construction of such a fastener for assembly onto external threads of a shaft and using a stress generator, preferably jack bolts, to impose a pre-stressing force on the threaded connection without applying torque to the threaded connection.

Heavy-duty forging presses are used, for example, in the metal working industry to shape and refine the metallurgical grain structure of a metal casting, usually a steel workpiece, by forging (pressing) the steel workpiece in a highly heated condition between dies. A forging press of this type is typically required to develop 5,000, or more tons of pressure between the dies and consists of massive parts essentially including a hydraulically driven ram in cylinder installed in a stationary upper crosshead. One or two pairs of tie rods sometimes called steel columns interconnect and anchor the upper crosshead to a large base. These parts are designed to be very heavy duty and thus usually very large so as to sustain the forces developed by the forging operation. The hydraulically driven ram is operated to move a crosshead carrying the upper forging die against the heated steel workpiece. The workpiece is manipulated between strokes of the ram for the forging operation into strategic positions resting on the stationary die located on the large stationary base to which the steel columns are attached. Other hydraulically operated piston and cylinder assemblies lift the ram; the crosshead and the upper forging die after each stroke of the ram for the forging operation.

The steel columns are used in pairs to tie the stationary upper cross head to the large stationary base and must resist the pressure developed between the dies. The steel columns have threaded ends protruding from the crosshead and base to receive a threaded nut member. Each nut member is provided with a threaded bore, typically, of the order of between one foot and three feet in diameter and torque must be applied to pre-stress the threaded connection to prevent impact loading between mating threads. The magnitude of the pre-stressing force should be in excess of the working forces including impact loading occurring during the forging operations so as to prevent permanent deformation particularly where clearances occur between the mating threads of nuts on the threaded ends of the steel columns. The threads on the steel column and the fastener nuts are of such physical proportions that the use of mechanized handling equipment is necessary for the removal and installation of the fastener nuts to accomplish necessary disassembly and reassembly of the forging press for servicing operations. Encrusting with air born particulates on the exposed threads of the steel columns that extend beyond each nut can cause a wedged or jammed condition when unthreading of the mating threads. Another problem occurring when servicing an existing forging press is deformation of the thread on the nut and the thread on the steel column at the site of the initial load transfer area is particularly troublesome because the distortion of the nut thread distorts the thread pitch that must traverse the entire thread travel during the nut removal process. These conditions are frequently known as nut lock-up and galling conditions. Even when installing nuts on new press columns, the presence of metal debris such as chips or nonconforming threads or even standard handling procedures can cause galling to occur. The weight of the nut and large contact area between mating threads can be sufficient to cause galling. Also, when an existing nut member cannot be reinstalled because of damage, the thread tolerance allowed within the thread on the steel column when manufactured, sometimes 30, 50 or more years historically, is very imprecise as compared with modern day standard tolerances, and thus thread mating difficulties occur when installing a newly manufactured replacement nut member. Similar problems are encountered in the construction and maintenance of other heavy-duty equipment used in the metal working industry and other industries where the force of a very large magnitude demands the use of threaded fastening nut members having such large physical size and weights so as to require mechanized handling equipment for installation and removal.

Accordingly, it is an object of the present invention to provide a fastener for ease of assembling onto and tensioning large threaded columns, rods, like those used in heavy-duty machinery, particularly forging presses, without requiring heavy-duty mechanized equipment for installation including pre-stressing of mating threads and removal of the fastener.

It is another object of the present invention to provide a fastener construction useful in the installation operation with the aid of ordinary hand tools and eliminate nut lock-up and galling conditions known to occur in the use of large heavy duty fasteners used to resist large forces.

SUMMARY OF THE INVENTION

According to the present invention there is provided a fastener to secure a threaded tie rod to a machine part, the fastener including the combination of a circular ring half divided along a plane intersecting a central longitudinal axis uniformly spaced from an internal thread between oppositely directed end walls, one of the end walls having a truncated conical load bearing surface defined with a projected apex intersecting the central axis without traversing the internal thread, bolts for clamping the half divided components of the circular ring half divided along axes extending tangential to the central longitudinal axis, and a hollow cylinder having an end wall containing a truncated conical thrust surface arranged to present a conjugate pair of truncated conical surfaces with the truncated conical load bearing surface, the truncated conical thrust surface being outwardly surrounded by a cylindrical stress generator body section containing a stress generator operative generate a pre stressing force extending parallel with the longitudinal central axis of the hollow cylinder whereby the conjugate pair of truncated conical surfaces resolve a force parallel to the central longitudinal axis generated by the stress generator toward a machine part to provide a component force directed radial inward toward the central longitudinal axis for urging the internal thread toward a mating thread on a tie rod when in the circular ring and provide another component force directed parallel to the central longitudinal axis to apply tension to the tie rod.

BRIEF DESCRIPTION OF THE SEVERAL VIEWS OF THE DRAWINGS

The present invention will be more fully understood when the following description is read in light of the accompanying drawings in which.

DETAILED DESCRIPTION OF THE INVENTION

Figure 1:
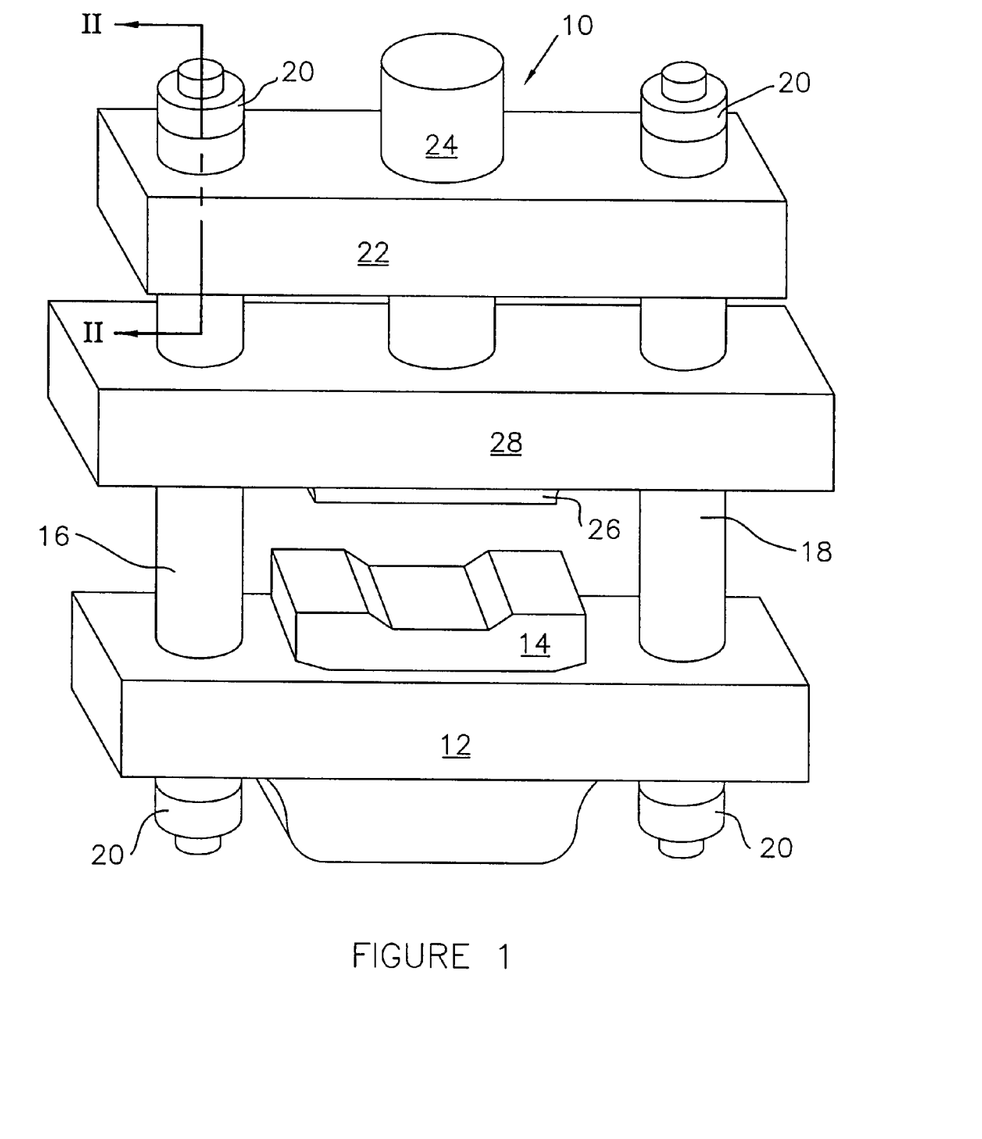
FIG. 1 is a schematic illustration of a forging press of the type used in the metal working industry to forge a highly heated workpiece and suitable for employing the fastener of the present invention.
Figure 2:
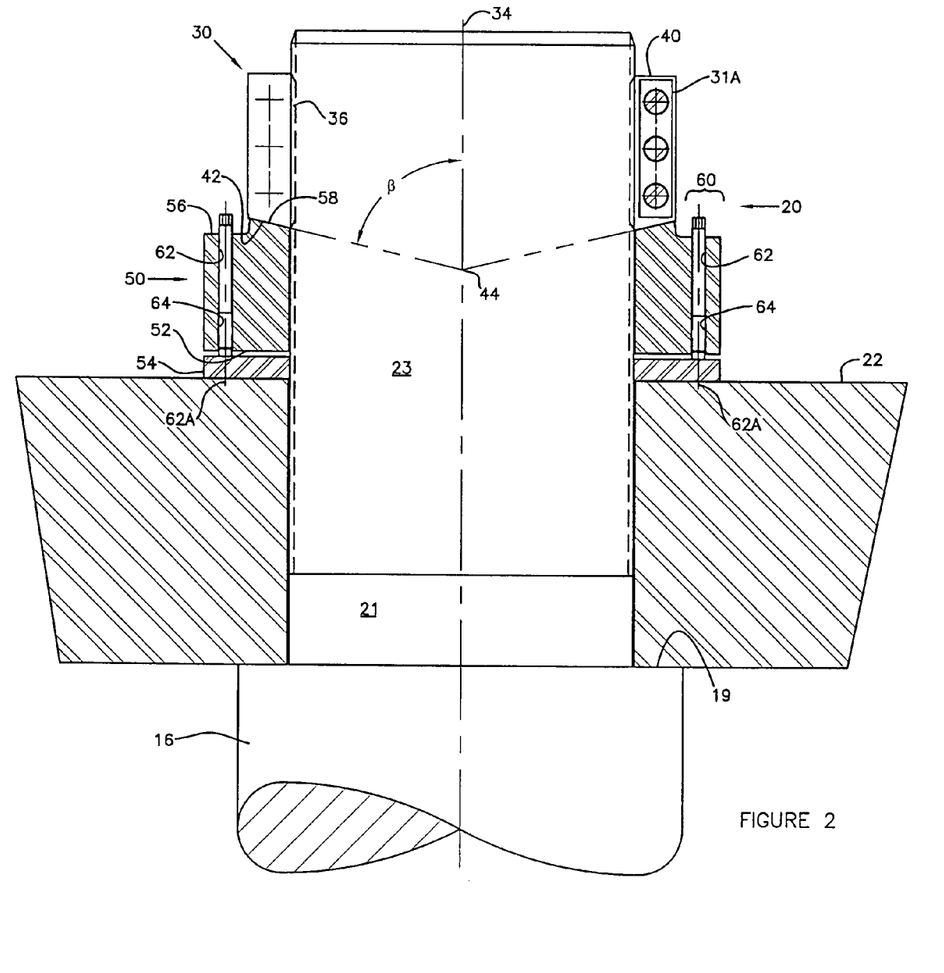
FIG. 2 is an enlarged sectional view taken along lines II-II of FIG. 1.

FIG. 1 illustrates the major components of a heavy duty and large capacity forging press 10 which is a typical example of a suitable application of a fastener embodying the features of the present invention. The forging press includes a foundation supported base 12 on which is mounted a stationary lower die 14 and spaced apart steel columns 16 and 18, sometimes called tie rods, have threaded end portions protruding through apertures in the base and secured thereto by fasteners 20. A cylinder and ram assembly 24 is secured between the cross head 22 and a movable crosshead 28 and operatively driven by a hydraulic system, not shown, to drive an upper die 26 against the heated steel workpiece while resting on the stationary lower die 14 with a sufficient force to hot work the metal of the workpiece. The upstanding free ends of the tie rods 16 and 18 also have threaded end portions that protrude through openings in a crosshead 22 and are secured to the cross head by fasteners 20. As shown in FIG. 2, each end of the steel columns 16 and 18 has a shoulder 19 from which there extends a reduced diameter portion 21 and thence a threaded end portion 23 protruding from through an opening in the crosshead 22 or base 12. Each threaded end portion 23 is secured by a fastener 20.

Figure 3:
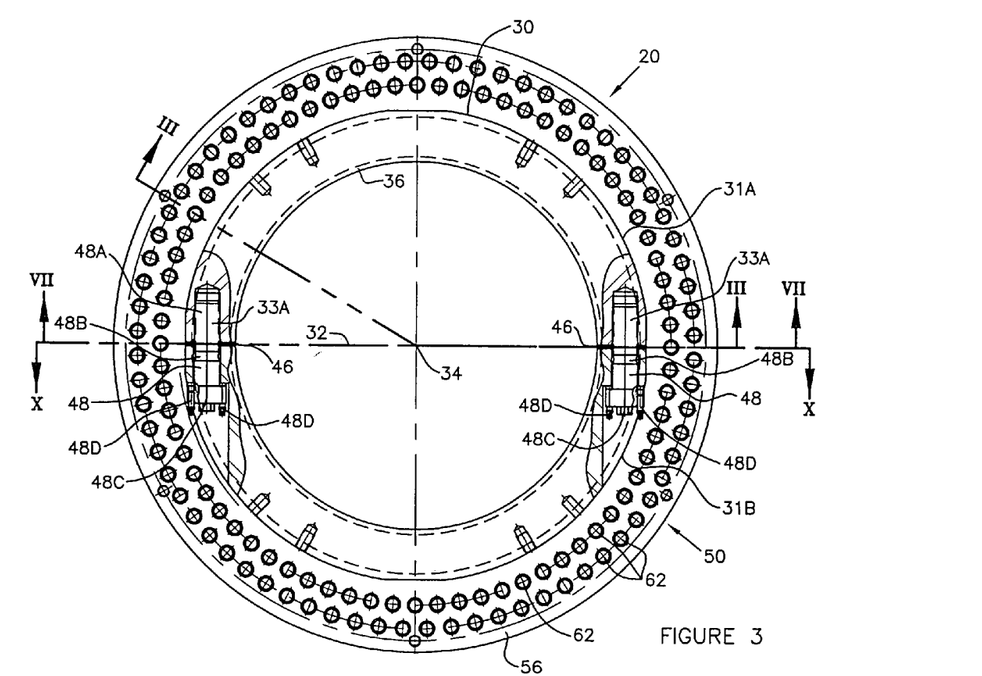
FIG. 3 is a plan view of FIG. 2.
Figure 4:
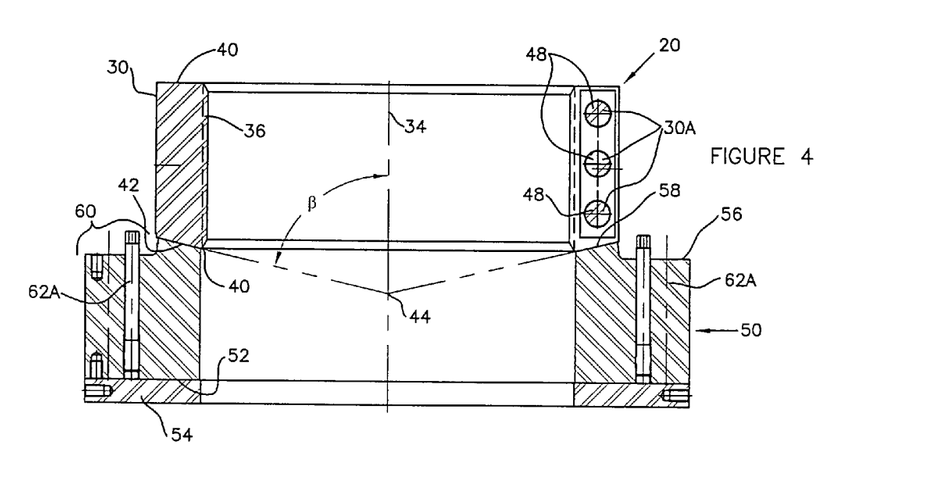
FIG. 4 is a sectional view taken along lines III-III of FIG. 3.
Figure 5:
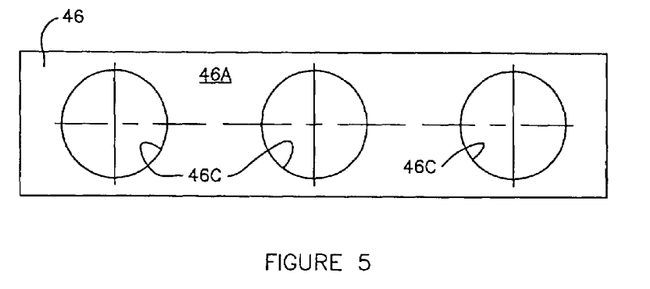
FIG. 5 is a plan view of a shim forming part of the fastener of the present invention.
Figure 6:
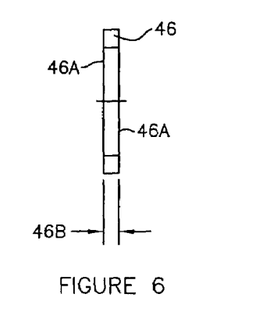
FIG. 6 is an end view of the shim shown in FIG. 5.
Figure 7:
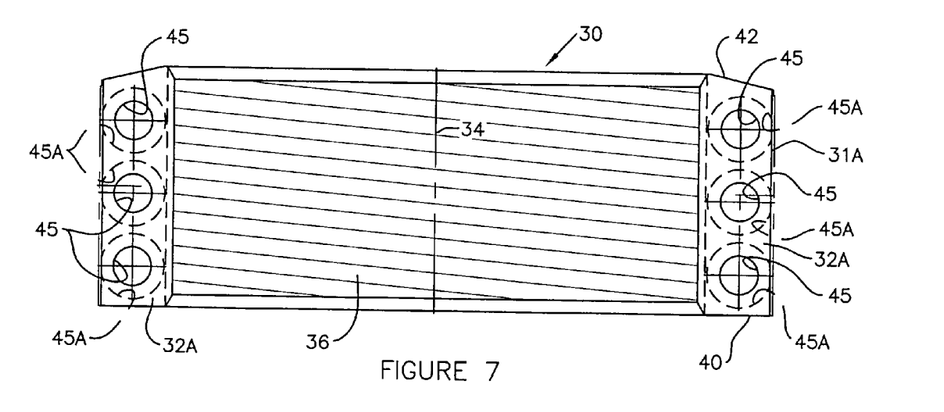
FIG. 7 is an elevation of one of the half-divided ring segments view taken along lines X-X of FIG. 3.
Figure 8:
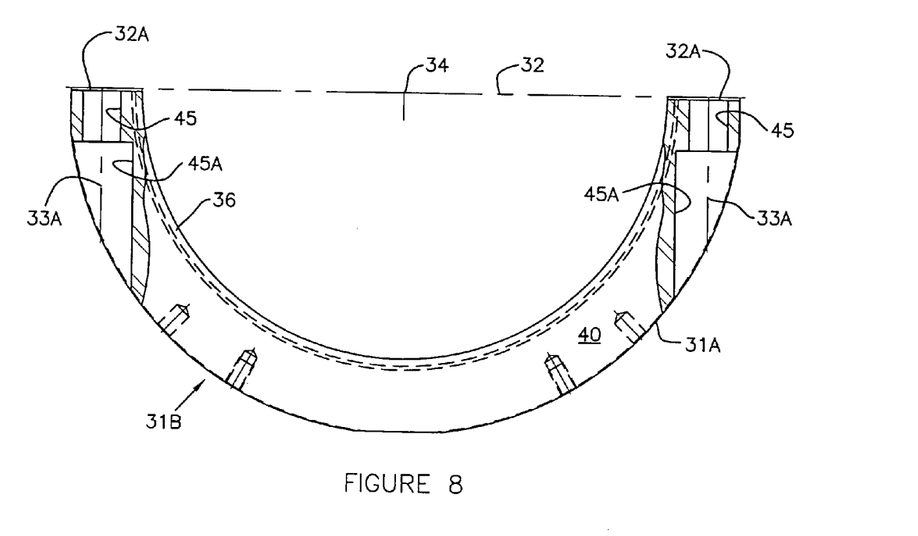
FIG. 8 is a plan view of the half divided ring segment shown in FIG. 7.
Figure 9:
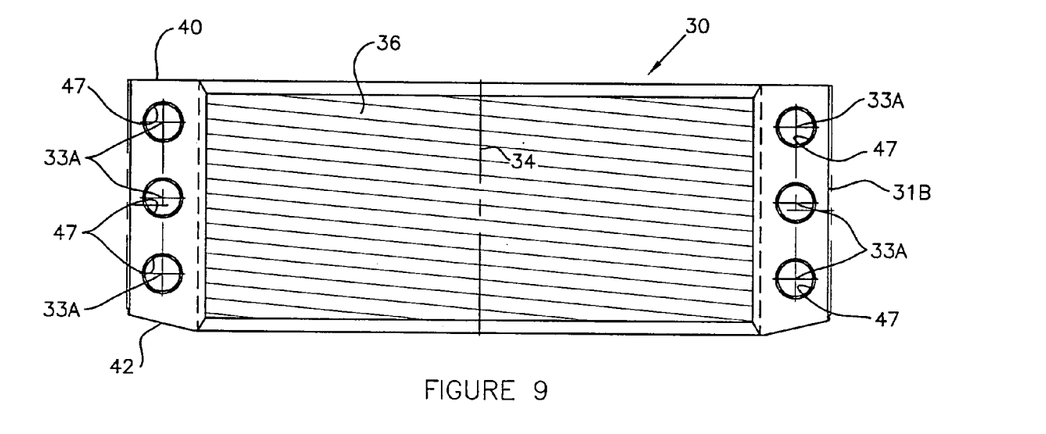
FIG. 9 is an elevation of the second of the half-divided ring segments view taken along lines VII-VII of FIG. 3.
Figure 10:
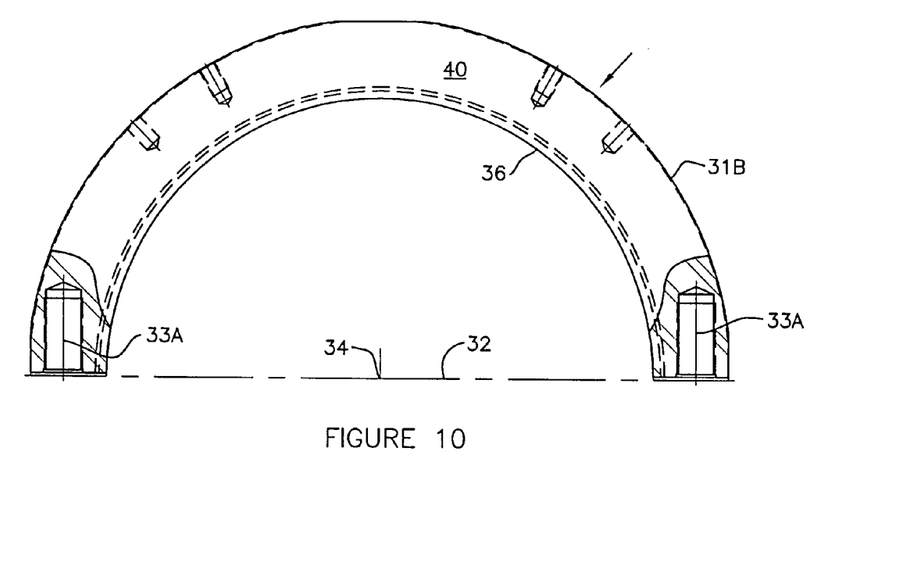
FIG. 10 is a plan view of the half divided ring segment shown in FIG. 9.

The fasteners 20 on each end portion of the steel columns are constructed identically and the details of the construction of the fastener according to the preferred embodiment of the present invention are illustrated in FIGS. 2-7. The fastener includes a circular ring 30 half divided along a plane 32 intersecting a central longitudinal axis 34 that is uniformly spaced from an internal thread 36 terminating at oppositely directed end walls 40 and 42. The end wall 42 provides a truncated conical load bearing surface defined with a projected apex 44 intersecting the central axis 34 without traversing the internal thread 36. The metal working process used to half divide the circular ring 30 will usually cause a loss of metal at the site of the cut line and thus forming approximate half ring segments 31A and 31B. The approximate half ring segments 31A and 31B are thus formed with opposing nut body wall faces 32A confronting the plane 32 containing the cut line along which the circular ring is half divided A shim 46, as shown in FIGS. 5 and 6, is made with flat wall faces 46A and a thickness designated by reference character 46B selected to compensate for the thickness of the metal lost as the result of the metal working process used to half divide the circular ring 30. Holes 46C are drilled at spaced apart intervals in the shim 46 of which two shims will be needed, one between the opposing nut body wall faces 32A. As shown in FIGS. 3, 7 and 8 spaced apart through holes 45 are drilled in the sidewall of the half ring segment 31A of the circular ring 30 along spaced apart axes 33A which are arranged tangential to the central longitudinal axis 34. Each of the tangential entry sites into the body of the ring segment is enlarged by counter bore 45A to accommodate the enlarged head portion of threaded bolts 48 used for clamping the half-divided components of circular ring together with the shims 46 extending along the parting line. As shown in FIGS. 3, 9 and 10 the same spaced apart axes 33A which are arranged tangential to the central longitudinal axis 34 and used to drill spaced apart blind holes 47 in the sidewall of the half ring segment 31B of the circular ring 30. The blind holes are threaded to receive the threaded portions of the threaded bolts 48.

Returning to FIG. 3, each of the threaded bolts 48 preferably take the form of a bolt which includes a threaded end portion 48A joined by a shank 48B to a head portion 48C. A plurality of jack bolts 48D are spaced about a bolt circle and each includes a threaded shank engaged with internal threads formed in the head portion 48C. The head of each jack bolt can be engaged by a suitable wrench or other device for applying torque to the jack bolt and thereby elastically tension the bolts 48 with sufficient force to reestablish the structural integrity of the circular ring 30 before the occurrence of the half dividing manufacturing process. An important feature of the present invention allows placement of the circular ring 30 onto threads of a steel column of a forging press or similar component of a machine without the need to rotate the circular ring. The clamping pressure can be applied to establish a threaded connection with threads on a shaft even though the threads are galled or otherwise stretched beyond the elastic limit of the material, contaminated with encrustation of foreign material, or relocated along the threads of the steel column to increase the effective length thereof as explained in detail hereinafter.

Figure 11:
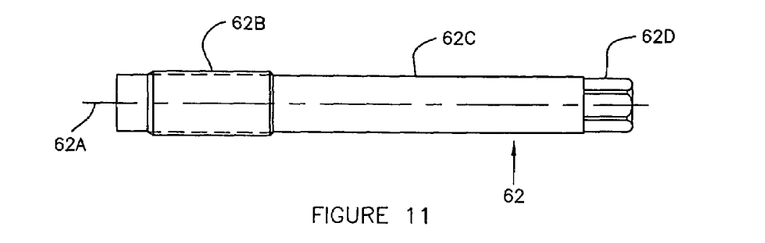
FIG. 11 is an illustration of a threaded jack bolt for pre-stressing the threads forming the fastener of the present invention.

A hollow cylinder 50 has an internal cylindrical sidewall with a diameter sufficiently enlarged to allow uniform spacing from the threads on the end portion of the associated steel column 16 or 18. This uniform spaced relation brings about a coaxial relation between the longitudinal central axis of the hollow cylinder with the axis 34. A transverse planar end wall 52 faces a washer 54 seated for load bearing contact with the base 12 or cross head 22 at the location of the thread end of the associated tie rod. The planer end wall 52 is opposite to an end wall 56 containing a truncated conical thrust surface 58 arranged to present a conjugate pair of truncated conical surfaces with the truncated conical load bearing surface 42. The truncated conical thrust surface 58 is outwardly surrounded by a body section 60 that is cylindrically shaped and contains a plurality of drilled holes 62 each including a threaded length 64. In the preferred embodiment of the invention illustrated in the drawings, the load transfer occurs along the threaded portions 64 that define a stress generator terminating at the plainer end wall 52 with threads of jack bolts 62 threadly engaged in the holes at spaced apart locations. The embodiment of the invention shown in the drawings utilizes the jackbolts 62 dispersed about two bolt circles to develop the magnitude of force needed to pre stress the threaded connection between the steel columns and the half divided fasteners 30. Each of the jackbolts 62 is arranged such that a longitudinal central axis 62A of the jack bolt is spaced from and extends parallel with the longitudinal central axis 34 projecting through the hollow cylinder 50. As shown in FIG. 11, a threaded end portion 62B is integral with a shank portion 62C terminating at a hexagon-shaped head portion 62D for receiving torque. The lengths of the shank portion 62C is chosen to insure that the hexagon-shaped head portion 62D will protrude from the body section 60 and threaded portion of each of the jack bolts is sufficient to always maintain sufficient load bearing contact with the washer 54 which can be hardened to better withstand the clamping force developed by torque applied to the jack bolts. The jackbolts can embody the construction of pintle bolts characterized by the location of the threads between the bolt head and a pintle shank with an elongated cylindrical sidewall.

Figure 12:
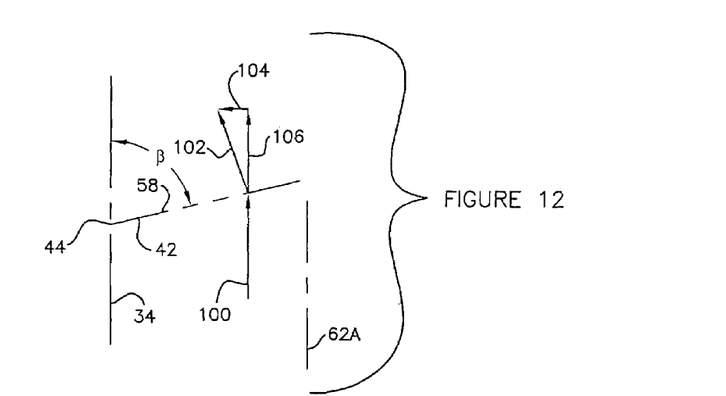
FIG. 12 a force diagram to illustrate a resolution of forces occurring in the use of the fastener of the present invention.

FIG. 12 illustrates a force diagram wherein the force generated by torque applied to the jackbolts 62 is identified by arrow 100 in a direction parallel to the central longitudinal axis 34. The conjugate pair of truncated conical surfaces 42 and 58 in metal to metal contact transfer the forces in the direction indicated by arrow 102 and the threaded connection between the half divided fastener 30 and the threaded end portions of the steel columns operate to resolve the forces indicated by arrows 102 into two force components, one component of force is illustrated by arrow 104 and the other component of force is identified by arrow 106. Force component 104 is a component force directed radial inward toward the central longitudinal axis for urging the internal thread toward a mating thread on a tie rod. The other component force 106 is directed parallel to the central longitudinal axis 34 to apply tension to the tie rod. The resolution of the forces are favorably generated by torque applied to the jack bolts 62 to provide a component force directed radial inward toward the central longitudinal axis by torque applied to the jack bolts without the need to torque the threads interconnecting the fastener 30 and the steel column 16,18.

This favorable resolution of forces is the result of the included angle β which is the included angle at the projected apex 44 between the truncated conical bearing surfaces 42 and 58 and the central axis 34. The included angle β is within the range of 70-80 degrees preferably within the range of 76-79 degrees. The favorable resolution of forces is further enhanced by the transfer of the force across a relative large surface area formed by the metal to metal contact across the conjugate pair of truncated conical surfaces 42 and 58.

The distance between the truncated conical thrust surface 58 and the plainer end wall 52 can be judicially selected to establish a desired location for the ring 30 and the effective length of the steel column between the fasteners at the opposite ends as explained previously. The use of jackbolts to generate the force identified by arrow 100 can be accomplished by other structures such as a hydraulically operated tensioner, per se known in the art and integrated in the cylindrical stress generator body section to provide the stress operative generate the pre stressing force extending parallel with the longitudinal central axis of the hollow cylinder 50.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A fastener to secure a threaded tie rod to a machine part, said fastener including the combination of:
   a circular ring being half divided along a plane intersecting a central longitudinal axis uniformly spaced from an internal thread between oppositely directed end walls, one of said end walls having a truncated conical load bearing surface defined with a projected apex intersecting said central longitudinal axis;
   said circular ring comprising half divided components;
   bolts for clamping the half divided components of said circular ring along axes extending tangential to said central longitudinal axis;
   a shim clamped by said bolts between opposing face surfaces formed by said half divided components of said circular ring; and
   a hollow cylinder having a central longitudinal axis in alignment with said central longitudinal axis of said circular ring and having an end wall containing a truncated conical thrust surface arranged to present a conjugate pair of truncated conical surfaces with said truncated conical load bearing surface of said circular ring, said truncated conical thrust surface of said hollow cylinder being outwardly surrounded by a cylindrical stress generator body section containing a stress generator operative to generate a pre-stressing force extending parallel with said central longitudinal axis of said hollow cylinder whereby said conjugate pair of truncated conical surfaces resolve the force parallel to said central longitudinal axis generated by said stress generator toward a machine part to provide a first component force directed radial inward toward said central longitudinal axis for urging said internal thread of said circular ring toward a mating thread on a tie rod when in said circular ring and provide a second component force directed parallel to said central longitudinal axis to apply tension to said tie rod.

2. The fastener according to claim 1 wherein said stress generator includes a plurality of jack bolts threadly engaged in holes at spaced apart locations in said hollow cylinder.

3. The fastener according to claim 2 wherein each of said jackbolts includes threaded ends extending from said circular ring into a force transmitting relation with said machine part.

4. The fastener according to claim 3 further including a washer between said each of said jack bolts and said machine part for transferring forces there between.

5. The fastener according to claim 1 wherein said bolts comprise a plurality of bolt assemblies having parallel longitudinal axis lying in planes extending tangential parallel to said central longitudinal axis.

6. A fastener to secure a threaded tie rod to a machine part, said fastener including the combination of:
   a circular ring being half divided along a plane intersecting a central longitudinal axis uniformly spaced from an internal thread between oppositely directed end walls, one of said end walls having a truncated conical load bearing surface defined with a projected apex intersecting said central longitudinal axis;
   said circular ring comprising half divided components;
   bolts for clamping the half divided components of said circular ring along axes extending tangential to said central longitudinal axis; and
   a hollow cylinder having a central longitudinal axis in alignment with said central longitudinal axis of said circular ring and having an end wall containing a truncated conical thrust surface arranged to present a conjugate pair of truncated conical surfaces with said truncated conical load bearing surface of said circular ring, said truncated conical thrust surface of said hollow cylinder being outwardly surrounded by a cylindrical stress generator body section containing a stress generator operative generate a pre-stressing force extending parallel with said central longitudinal axis of said hollow cylinder whereby said conjugate pair of truncated conical surfaces resolve the force parallel to said central longitudinal axis generated by said stress generator toward a machine part to provide a first component force directed radial inward toward said central longitudinal axis for urging said internal thread of said circular ring toward a mating thread on a tie rod when in said circular ring and to provide a second component force directed parallel to said central longitudinal axis to apply tension to said tie rod;

wherein said circular ring components have opposing nut body wall faces confronting said plane along which said circular ring is half divided, said circular ring wall faces being traversed by said bolts; and wherein each of said bolts include an elongated shank part extending from an aperture traversing one of said half divided components of said circular ring and anchored within the other of said half divided components of said circular ring, a stress generating flange connected to said shank part extending from an aperture for exerting a compressive force on said one of said half divided components, said stress generating flange having a plurality of holes at spaced-apart locations about an outer peripheral part thereof to overlie said one of said half divided components, and a plurality of threaded jack bolts engaged with said holes to separately receive a torque, the jack bolts having end parts extending from said holes to stress said one of said half divided components between said other of said half divided components and said stress generating flange through torquing said jack bolts.

7. A fastener to secure a threaded tie rod to a machine part, said fastener including the combination of:

a circular ring being half divided along a plane intersecting a central longitudinal axis uniformly spaced from an internal thread between oppositely directed end walls, one of said end walls having a truncated conical load bearing surface defined with a projected apex intersecting said central longitudinal axis:

said circular ring comprising half divided components:

bolts for clamping the half divided components of said circular ring along axes extending tangential to said central longitudinal axis; and a hollow cylinder having a central longitudinal axis in alignment with said central longitudinal axis of said circular ring and having an end wall containing a truncated conical thrust surface arranged to present a conjugate pair of truncated conical surfaces with said truncated conical load bearing surface, said truncated conical thrust surface of said hollow cylinder being outwardly surrounded by a cylindrical stress generator body section containing a stress generator operative to generate a pre-stressing force extending parallel with said central longitudinal axis of said hollow cylinder whereby said conjugate pair of truncated conical surfaces resolve the force parallel to said central longitudinal axis generated by said stress generator toward a machine part to provide a first component force directed radial inward toward said central longitudinal axis for urging said internal thread of said circular ring toward a mating thread on a tie rod when in said circular ring and to provide a second component force directed parallel to said central longitudinal axis to apply tension to said tie rod;

wherein said bolts comprise a plurality of bolt assemblies having parallel longitudinal axes lying in planes extending parallel to said central longitudinal axis, and wherein each of said plurality of bolt assemblies include an elongated shank part extending from an aperture traversing one of said half divided components of said circular ring and anchored within the other of said half divided components of said circular ring, a stress generating flange connected to said shank part extending from an aperture for exerting a compressive force on said one of said half divided components, said stress generating flange having a plurality of holes at spaced-apart locations about an outer peripheral part thereof to overlie said one of said half divided components, and a plurality of threaded jack bolts engaged with said holes to separately receive a torque, the jack bolts having end parts extending from said holes to stress said one of said half divided components between said other of said half divided components and said stress generating flange through torquing said jack bolts.

8. A fastener to secure a threaded tie rod to a machine part, said fastener including the combination of:

a circular ring being half divided along a plane intersecting a central longitudinal axis uniformly spaced from an internal thread between oppositely directed end walls, one of said end walls having a truncated conical load bearing surface defined with a projected apex intersecting said central longitudinal axis;

said circular ring comprising half divided components;

bolts for clamping the half divided components of said circular ring along axes extending tangential to said central longitudinal axis; and a hollow cylinder having a central longitudinal axis in alignment with said central longitudinal axis of said circular ring and having an end wall containing a truncated conical thrust surface arranged to present a conjugate pair of truncated conical surfaces with said truncated conical load bearing surface of said circular ring, said truncated conical thrust surface of said hollow cylinder being outwardly surrounded by a cylindrical stress generator body section containing a stress generator operative to generate a pre-stressing force extending parallel with said central longitudinal axis of said hollow cylinder whereby said conjugate pair of truncated conical surfaces resolve the force parallel to said central longitudinal axis generated by said stress generator toward a machine part to provide a first component force directed radial inward toward said central longitudinal axis for urging said internal thread of said circular ring toward a mating thread on a tie rod when in said circular ring and to provide a second component force directed parallel to said central longitudinal axis to apply tension to said tie rod;

wherein said stress generator includes a plurality of jack bolts; and wherein said first component force directed radial inward toward said central longitudinal axis is provided by torquing said jack bolts at an included angle within the range of 70-80 degrees.

9. The fastener according to claim 8 wherein said included angle is within the range of 76-79 degrees.

10. A fastener to secure a threaded tie rod to a machine part, said fastener including the combination of:

a circular ring being half divided along a plane intersecting a central longitudinal axis uniformly spaced from an internal thread between oppositely directed end walls, one of said end walls having a truncated conical load bearing surface defined with a projected apex intersecting said central longitudinal axis;

said circular ring comprising half divided components;

bolts for clamping the half divided components of said circular ring along axes extending tangential to said central longitudinal axis; and a hollow cylinder having a central longitudinal axis in alignment with said central longitudinal axis of said circular ring and having an end wall containing a truncated conical thrust surface arranged to present a conjugate pair of truncated conical surfaces with said truncated conical load bearing surface of said circular ring, said truncated conical thrust surface of said hollow cylinder being outwardly surrounded by a cylindrical stress generator body section containing a stress generator operative to generate a pre-stressing force extending parallel with said central longitudinal axis of said hollow cylinder whereby said conjugate pair of truncated conical surfaces resolve the force parallel to said central longitudinal axis generated by said stress generator toward a machine part to provide a first component force directed radial inward toward said central longitudinal axis for urging said internal thread of said circular ring toward a mating thread on a tie rod when in said circular ring and to provide a second component force directed parallel to said central longitudinal axis to apply tension to said tie rod, wherein said first component force directed radial inward toward said central longitudinal axis is a result of providing an included angle within the range of 70-80 degrees, which included angle is formed at said projected apex between said conjugate pair of truncated conical surfaces and said central longitudinal axis of said hollow cylinder.

11. The fastener according to claim 10 wherein said stress generator includes a plurality of jack bolts threadly engaged in holes at spaced apart locations in said hollow cylinder.

12. The fastener according to claim 11 wherein each of said jackbolts includes threaded ends extending from said circular ring into a force transmitting relation with said machine part.

13. The fastener according to claim 12 further including a washer between said each of said jack bolts and said machine part for transferring forces there between.

* * * * *